(12) United States Patent
Cherney et al.

(10) Patent No.: US 11,131,076 B2
(45) Date of Patent: Sep. 28, 2021

(54) CONTROLLING A WORK MACHINE BASED ON IN-RUBBER TIRE/TRACK SENSOR

(71) Applicant: Deere & Company, Moline, IL (US)

(72) Inventors: Mark J. Cherney, Potosi, WI (US); Michael G. Kean, Maquoketa, IA (US)

(73) Assignee: Deere & Company, Moline, IL (US)

( * ) Notice: Subject to any disclaimer, the term of this patent is extended or adjusted under 35 U.S.C. 154(b) by 78 days.

(21) Appl. No.: 16/122,275

(22) Filed: Sep. 5, 2018

(65) Prior Publication Data
US 2020/0071908 A1    Mar. 5, 2020

(51) Int. Cl.
| | |
|---|---|
| E02F 3/43 | (2006.01) |
| B60C 11/18 | (2006.01) |
| A01B 63/112 | (2006.01) |
| E02F 9/26 | (2006.01) |
| G05D 1/02 | (2020.01) |
| B60W 10/04 | (2006.01) |
| B60W 10/10 | (2012.01) |
| B60W 10/18 | (2012.01) |

(Continued)

(52) U.S. Cl.
CPC ............. *E02F 3/431* (2013.01); *B60W 10/04* (2013.01); *B60W 10/10* (2013.01); *B60W 10/18* (2013.01); *B60W 10/20* (2013.01); *E02F 3/3417* (2013.01); *E02F 9/26* (2013.01); *G05D 1/021* (2013.01); *B60W 2300/17* (2013.01); *B60W 2400/00* (2013.01); *B60W 2422/70* (2013.01); *B60W 2520/00* (2013.01); *B60W 2710/10* (2013.01); *B60W 2710/18* (2013.01); *B60W 2710/20* (2013.01); *B60W 2710/30* (2013.01); *B60W 2720/10* (2013.01); *B60W 2900/00* (2013.01); *E02F 9/264* (2013.01); *G05D 2201/0202* (2013.01)

(58) Field of Classification Search
CPC ... E02F 3/43; E02F 3/205; E02F 3/847; E02F 9/085; B60C 23/00; B60C 11/18; B60C 23/003; G06F 17/00; A01B 63/112; A01B 679/00; G01P 3/446; B60T 8/17555
See application file for complete search history.

(56) References Cited

U.S. PATENT DOCUMENTS 6,098,682 A * 8/2000 Kis ....................... B60C 23/003
                                                        152/415
6,371,214 B1 * 4/2002 Anwar ..................... E02F 3/434
                                                        172/1
(Continued)

FOREIGN PATENT DOCUMENTS

| DE | 10010011 A1 | 2/2001 |
| DE | 10017358 A1 | 10/2001 |

(Continued)

OTHER PUBLICATIONS

German Search Report issued in counterpart application No. 102019213240.5 dated Jan. 21, 2020 (14 pages).

*Primary Examiner* — Yuri Kan
(74) *Attorney, Agent, or Firm* — Joseph R. Kelly; Kelly, Holt & Christenson PLLC

(57) ABSTRACT

A stability control system identifies an actionable condition, such as instability, in an off-road mobile machine, based upon an in-rubber tire sensor. A remedial action is identified, and a control signal is generated to control the mobile machine to take the remedial action.

20 Claims, 12 Drawing Sheets

(51) Int. Cl.
*B60W 10/20* (2006.01)
*E02F 3/34* (2006.01)

(56) References Cited

U.S. PATENT DOCUMENTS

| | | | | |
|---|---|---|---|---|
| 6,845,311 B1* | 1/2005 | Stratton | ............... | E02F 3/847 340/870.16 |
| 7,066,226 B1* | 6/2006 | Fiore | ............... | B60C 11/1612 152/208 |
| 2003/0093207 A1* | 5/2003 | Pallot | ............... | B60T 8/17555 701/70 |
| 2006/0259225 A1* | 11/2006 | Ono | ............... | B60G 17/016 701/82 |
| 2008/0125947 A1* | 5/2008 | Hattori | ............... | B60W 10/184 701/70 |
| 2008/0208416 A1 | 8/2008 | Yuet et al. | | |
| 2009/0182471 A1* | 7/2009 | Bucher | ............... | A01D 34/662 701/50 |
| 2010/0271191 A1* | 10/2010 | de Graff | ............... | B60C 23/0408 340/447 |
| 2013/0298728 A1* | 11/2013 | Gartenmaier | ............... | E02F 9/085 74/99 R |
| 2014/0236431 A1* | 8/2014 | Hendrickson | ............... | A01B 69/007 701/50 |
| 2014/0372006 A1* | 12/2014 | Hammerschmidt | ............... | B60C 23/062 701/71 |
| 2016/0114634 A1* | 4/2016 | Lubben | ............... | B60C 23/003 152/417 |

FOREIGN PATENT DOCUMENTS

| | | |
|---|---|---|
| DE | 102011052808 A1 | 1/2013 |
| DE | 202013101202 U1 | 3/2013 |
| DE | 102013018510 A1 | 5/2014 |
| DE | 112014005213 T5 | 8/2016 |

* cited by examiner

US 11,131,076 B2

CONTROLLING A WORK MACHINE BASED ON IN-RUBBER TIRE/TRACK SENSOR

FIELD OF THE DESCRIPTION

The present description relates to using in-rubber sensors in the ground-engaging elements (e.g., tires or tracks) of an off-road vehicle, such as an agricultural vehicle, a forestry vehicle or construction vehicle. More specifically, the present description relates to controlling the vehicle based upon sensor signals from sensors.

BACKGROUND

There are a wide variety of different types of vehicles or mobile machines. Such machines include, for instance, agricultural machines, forestry machines and construction machines. Examples of agricultural machines include such things as combines, tractors, sprayers, etc. Some examples of forestry machines include skidders, feller bunchers, knuckle boom loaders, swing machines, etc. Some examples of construction machines include dump trucks, loaders, excavators, among other things.

Each of these different types of machines are propelled by a propulsion system (such as an engine) that drives ground-engaging elements (such as rubber tires or tracks) through a transmission. These types of vehicles or machines often operate in environments which render them relatively unstable. For instance, when a loader is operating on a side hill, with a heavy load in a raised bucket, the stability of the loader can be compromised. This is just one example.

There are also some tire sensors available that provide information, in addition to tire pressure. For instance, some tire sensors are in-rubber sensors that sense, and generate an output indicative of, rubber temperature, the size of the contact patch of the rubber with the surface over which it is traveling, acceleration vectors, velocity vectors, tire deflection, and load.

The discussion above is merely provided for general background information and is not intended to be used as an aid in determining the scope of the claimed subject matter.

SUMMARY

A stability control system identifies an actionable condition, such as instability, in an off-road mobile machine, based upon an in-rubber sensor. A remedial action is identified, and a control signal is generated to control the mobile machine to take the remedial action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
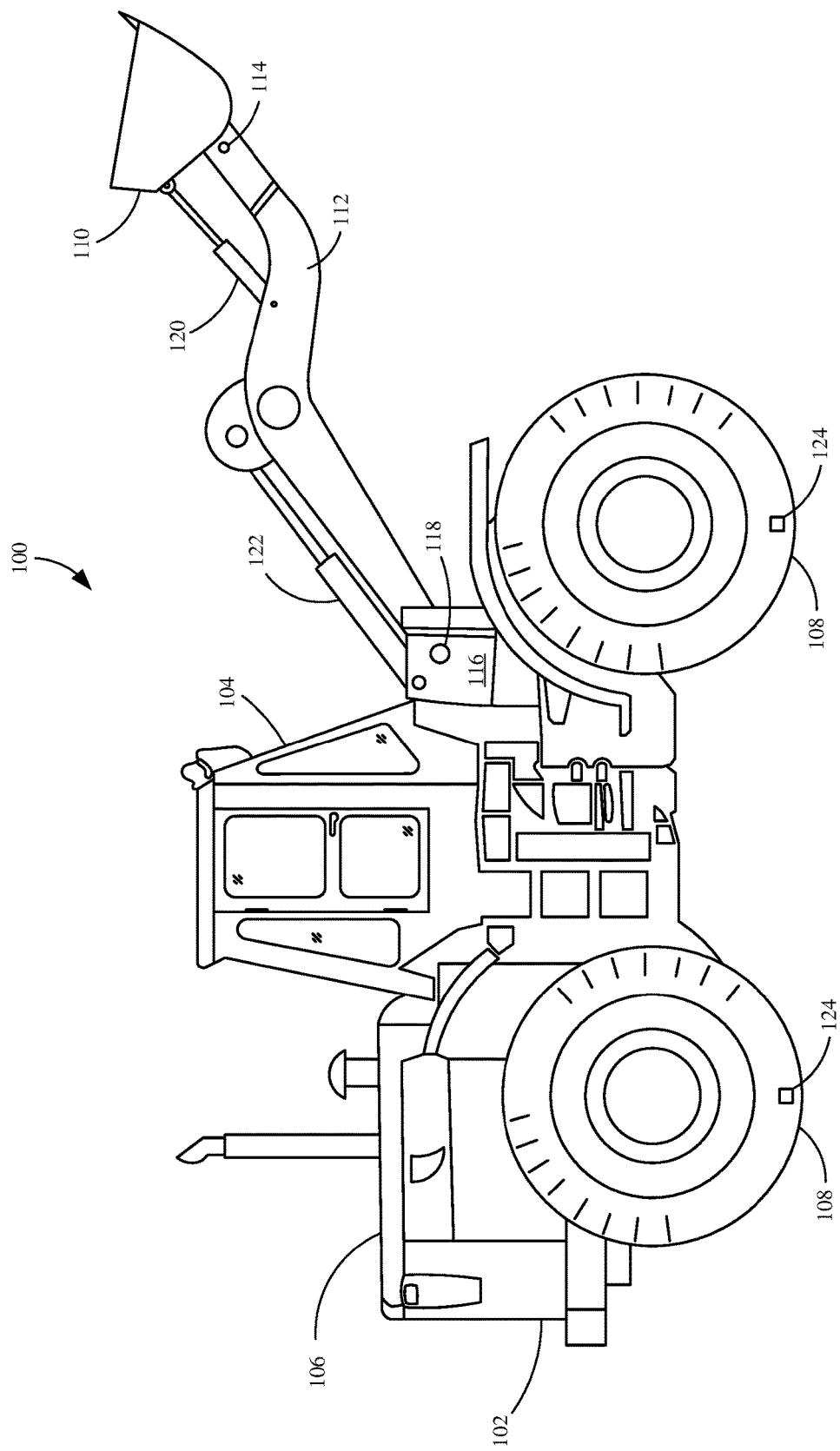
FIG. 1 is a pictorial illustration of one example of an off-road mobile machine.

FIG. 1 is a pictorial illustration of one example of a mobile work machine 100. In the example illustrated in FIG. 1, mobile work machine 100 is a loader that has a frame 102 that supports an operator compartment 104. Frame 102 also illustratively supports an engine compartment 106 that houses an engine that is used to drive a transmission which, in turn, drives ground-engaging elements 108 which, in the example shown in FIG. 1, are tires. It will be noted, however, that ground-engaging elements 108 can be other elements, such as tracks, etc.

Mobile work machine 100 also includes an implement (e.g., a bucket) 110 that is pivotably supported to boom 112 at connection 114. Boom 112 is pivotably supported to the frame 102 through a support member 116, at pivot axis 118. Pivotal movement of bucket 110 relative to boom 112 is illustratively driven by actuator 120. Actuator 120 can be any of a wide variety of actuators, such as a hydraulic cylinder or other actuator. Pivotal movement of boom 112 relative to support member 116 is illustratively driven by actuator 118 which can also be a hydraulic cylinder or other actuator.

Operator component 104 illustratively includes operator interface mechanisms that allow an operator to control and manipulate machine 100. The operator interface mechanisms in operator compartment 104 can be any of a wide variety of different types of mechanisms. For instance, they can include input mechanisms such as a steering wheel, levers, joysticks, buttons, pedals, switches, etc. In addition, operator compartment 104 may include an operator interface display device, such as a monitor, or mobile device that is supported within operator compartment 104. In that case, the operator interface mechanisms can also include user actuatable elements displayed on the display device, such as icons, links, buttons, etc. The operator interface mechanisms can include a microphone where speech recognition is provided on machine 100. They can also include audio interface mechanisms (such as speakers), a haptic interface mechanism or a wide variety of other operator interface mechanisms. The operator interface mechanisms can include other output mechanisms as well, such as dials, gauges, meter outputs, lights, audible or visual alerts or haptic outputs, etc.

In the example shown in FIG. 1, each of the tires 108 illustratively include one or more in-rubber sensors systems 124 that are disposed within the rubber of the corresponding tire 108 and sense different variables and generate outputs based upon the sensed variables. As will be described in greater detail below, sensor systems 124 can output values indicative of tire pressure, rubber temperature, the size of the patch of rubber of tire 108 that is in contact with the surface over which it is traveling, acceleration vectors, velocity vectors, deflection, load, etc.

Also, as is discussed in greater detail below, machine 100 can have a variety of other sensors. Those sensors can include, for instance, position sensors that sense the relative position of bucket 110 relative to boom 112. They can also include sensors that sense the relative position of boom 112 relative to frame 102 or support member 116. Those types of sensors can include rotational potentiometers, angle encoders, Hall Effect sensors, or other sensors that sense the relative position of the two parts. They can also include sensors on hydraulic actuators 120 and 122 that sense the extent to which the corresponding actuator is retracted or extended. This, in combination with the known geometry of the various pieces on machine 100, can provide an indication of the relative positions of the two pieces that are connected to the corresponding actuator. In addition, machine 100 can have a geographic position sensor, such as a GPS receiver or other sensor. It can have wheel speed sensors that sense the speed of rotation of wheels 108. It can have a ground speed sensor that senses the speed of travel of machine 100 over the ground. It can have a wide variety of different sensors that sense the performance and other characteristics of the engine or other parts of machine 100.

It will be appreciated that, during operation, machine 100 may become unstable, and in danger of tipping. By way of example, assume that machine 100 is carrying a relatively heavy load in bucket 110, and the bucket 110 is raised to a relatively high position, relative to frame 102. Assume also that machine 100 is traveling over sloped terrain. In that case, the center of gravity of machine 100 may be located in a position that renders it unstable, and in danger of tipping. By way of example, a line connecting the contact patches for each of the tires 108 (the contact patches for each tire being the area of each tire 108 that is in contact with the surface over which it is traveling) may define a polygon. If the center of gravity of machine 100 is outside that polygon, then machine 100 may be in danger of tipping (or may be unstable). Thus, in one example, the sensor signals output by sensors 124 can be used in controlling machine 100, automatically, to perform stability control to reduce the likelihood that it enters an unstable condition, or to move it out of an unstable condition.

Figure 2:
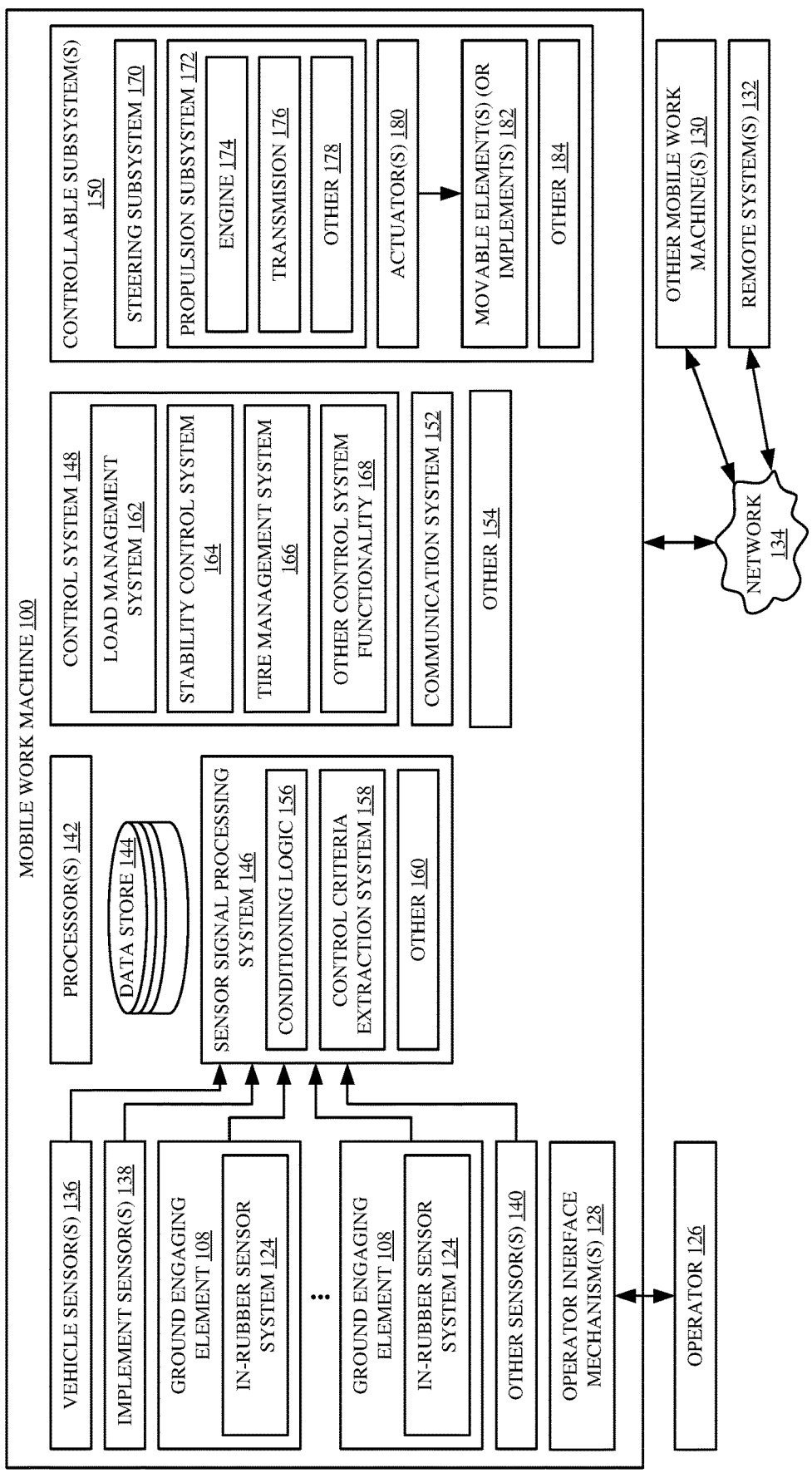
FIG. 2 is a block diagram showing parts of the mobile machine illustrated in FIG. 1, in more detail.

FIG. 2 is a block diagram showing one example of machine 100. Some of the items in FIG. 2 are similar to those shown in FIG. 1, and they are similarly, numbered. FIG. 2 shows that, in one example, operator 126 provides inputs through operator input mechanisms 128 in order to control and manipulate mobile work machine 100. Some of the examples of operator interface mechanisms 128 are described above. FIG. 2 also shows that, in one example, mobile work machine 100 can communicate with other mobile work machines 130 or other remote systems 132 over network 134. Network 134 can include a wide area network, a local area network, a near field communication network, a cellular communication network or other networks or combinations of networks. In addition, as is described in greater detail below, mobile work machine 100 can communicate with other systems using store and forward techniques as well.

Remote systems 132 can include remote computing systems or cloud-based systems, vendor or maintenance computing systems, manager computing systems, or a wide variety of other computing systems. These and other architectures are contemplated herein.

Also, in addition to the ground-engaging elements 108 and in-rubber sensor systems 104, FIG. 2 shows that mobile work machine 100 can include vehicle sensors 136, implement sensors 138, and a wide variety of other sensors 140. Some examples of those sensors were discussed above.

Machine 100 also includes one or more processors 142, a data store 144, sensor signal processing system 146, control system 148, controllable subsystems 150, communication system 152, and it can include a wide variety of other items 154. Sensor signal processing system 146, itself, illustratively includes conditioning logic 156, control criteria extraction system 158, and it can include other items 160. Control system 148 illustratively includes load management system 162, stability control system 164, tire management system 166, and it can include other control system functionality 168. Controllable subsystems 150 illustratively include steering subsystem 170, propulsion subsystem 172 (which, itself, can include engine 174, transmission 176, and other items 178), actuators 180 and movable elements (or implements) 182. Controllable subsystems 150 can include other items 184 as well. Before describing the overall operation of machine 100 in more detail, a brief description of some of the items in mobile work machine 100, and their operation, will first be provided.

The ground-engaging elements 108 and in-rubber sensing systems 124 were briefly described above, as were some vehicle sensors 136, implement sensors 138, other sensors 140, and operator interface mechanisms 128.

Sensor signal processing system 146 illustratively receives the various sensor signals and can perform some processing on them. For instance, condition logic 156 can condition the sensor signals. The conditioning operations can include filtering, amplifying, linearizing, normalizing, among other things. Control criteria extraction system 158 then extracts various control criteria from the sensor signals. For instance, it can extract information such as the center of gravity of mobile work machine 100, from the signals generated by in-rubber sensor systems 124. It can extract information indicative of the number of rotations that each of the tires containing a sensor system 124 have performed. It can extract information indicative of the wear level of the ground-engaging elements 108. It can extract information indicative of the traction that each of the tires has, the size of the contact patch (the part of each tire 108 that is in contact with the surface over which it is traveling), the condition of the pathway over which the tires are traveling, among other things.

The control criteria can be provided to control system 148 which generates control signals to control various controllable subsystems 150 based upon the control criteria. For instance, load management system 162 can generate control signals to control various actuators 180 that move the movable elements (e.g., boom 112 and bucket 110) on mobile work machine 100, based upon the current load. Stability control system 164 can generate control signals to avoid entering an unstable condition, or to control various portions of machine 100 so that it exits an unstable condition. By way of example, assume that the control criteria extraction system 158 extracts a center of gravity location based upon the information from the various in-rubber sensor systems 124. If the center of gravity indicates that machine 100 is in an unstable condition, then stability control system 164 can generate control signals to control actuators 180 to lower bucket 110 or to control propulsion system 170 to reduce the speed of machine 100, or to control steering system 170 to limit the steering angle of machine 100, or to control a wide variety of the other controllable subsystems 150 to inhibit machine 100 from entering an unstable condition, or to address an unstable condition once it has been detected.

Tire management system 166 can generate control signals to control communication system 152 or operator interface mechanisms 128, or both, to provide information indicative of the wear on the various tires (or other ground-engaging elements) 108. It can also generate control signals to control propulsion subsystem 170, for example, to limit the travel speed of machine 100, where the tires have significant wear on them.

As briefly mentioned above, the steering subsystem 170 illustratively controls the steering of mobile work machine 100. It can be controlled based on inputs through operator interface mechanisms 128 (such as a steering wheel, a joystick, etc.).

Propulsion subsystem 170 illustratively includes engine 174 and transmission 176. These items can be controlled by operator inputs 126 through operator interface mechanisms 128 and control system 148.

Actuators 180 (which can be actuators 120 and 122) drive movement of the movable elements 182 on machine 100. The movable elements 182 can be boom 112, bucket 110, or a wide variety of other movable elements that are driven by actuators 180. The actuators 180 can also be controlled by operator inputs through operator interface mechanism 128, by control system 148, or in other ways.

Communication system 152 can be used to facilitate communication among various items on mobile work machine 100 (such as communication over a controller area network-CAN-bus) and also to facilitate communication between items on mobile work machine 100 and remote systems 132 or other mobile work machines 130 over network 134. Therefore, depending on the type of network 134 that is being used, communication system 152 may be any type of communication system that can be used to communicate over that type of network.

Figure 3:
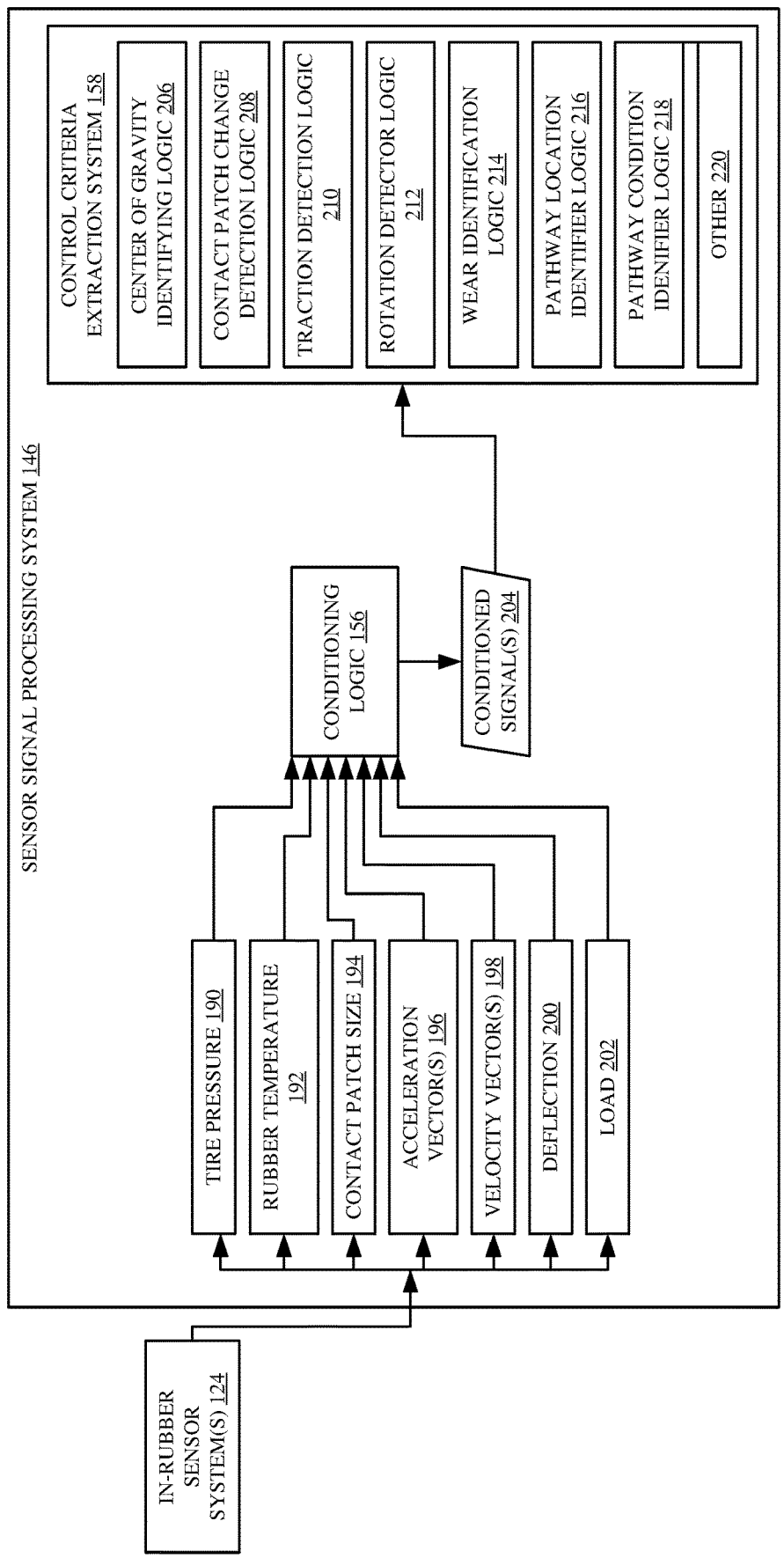
FIG. 3 is a block diagram showing one example of a sensor signal processing system in more detail.

FIG. 3 is a block diagram showing one example of sensor signal processing system 146, in more detail. In the example illustrated, system 146 receives the sensor signals from in-rubber sensor systems 124. Those signals can provide values indicative of tire pressure 190, rubber temperature 192, contact patch size 194, acceleration vectors 196, velocity vectors 198, tire deflection 200, and tire load 202. As described above, the signals can be provided to conditioning logic 156 for signal conditioning, in order to obtain conditioned signals 204. The conditioned signals 204 are provided to system 156 for the extraction of various criteria that will be used by the items in control system 148 to control the controllable subsystems 150. Center of gravity identification logic 206 illustratively identifies the center of gravity of machine 100 based upon one or more of the signals. By way of example, using the load 202 on each of the tires, as well as knowing the configuration and/or dimension characteristics of machine 100, and further knowing the orientation of machine 100, logic 206 can identify the center of gravity of machine 100. It can identify a location of the center of gravity relative to the frame 102 of machine 100, relative to a polygon bounded by a line joining the contact patches of the various tires 108, or relative to machine 100 in other ways.

Contact patch change detection logic 208 illustratively identifies changes in the size of the contact patches for each of the tires 108. In an example where the contact patch size 194 is provided directly by the in-rubber sensor system 124, the contact patch sizes can be compared to one another over time to determine whether the contact patch size, for the same tire, for a given tire is increasing in size, decreasing in size, fluctuating, or remaining the same. In another example, logic 208 can calculate the contact patch size, itself, and then detect changes. By way of example, the velocity vectors 198 may indicate a rotational movement when the portion of the rubber that contains the sensor system 124 is not contacting the ground. However, once that portion of the rubber contacts the ground, the velocity vector will be generally linear, across the entire length of the contact patch. By knowing the width of the tires, the area of the contact patch can be calculated. Also, even if the width of the tires is not known, the length of the contact patch can be calculated by knowing the velocity of each of the tires and time during which the velocity vector is linear as opposed to rotational.

Traction detection logic 210 illustratively detects a characteristic of the traction of each of the tires 108. For example, it can use the velocity vectors 198 or acceleration vectors 196 to determine whether the tires are slipping. This may be indicative of the quality of traction that each of the tires currently has relative to the ground over which it is traveling.

Rotation detector logic 212 illustratively identifies the number of rotations of each of the tires. This can be identified from the acceleration or velocity vectors 196 or 198, respectively, and how they change as the rubber that contains sensor 124 engages the ground. It can be identified in other ways as well.

Wear identification logic 214 illustratively generates a value indicative of tire wear. For example, it can use an algorithm that takes into account the load 202 on each tire, the tire pressure 190 and rubber temperature 192 as well as tire deflection 200, and the number of rotations that a tire has undergone. Any or all of these values, and/or other values, can be used in an algorithm to estimate tire wear.

Pathway location identifier logic 216 illustratively generates an output indicative of a location of the pathway over which the corresponding tire 108 has traveled. By knowing the location of machine 100 (such as by using a GPS receiver), and by knowing the dimensional characteristics of machine 100, logic 120 illustratively knows the location of each of the tires 108 relative to the location provided by the GPS receiver. Thus, logic 216 can identify the path that was covered by each tire 108. This may be used, for instance, when machine 100 is attempting to travel over the same path in order to increase the compaction of the ground over which it is traveling. It may also be used in order to repeatedly travel over different paths, to avoid compaction. Similarly, it may be used to estimate the condition of the pathway, based upon the amount of traffic it has endured. These and other scenarios are contemplated herein.

Pathway condition identifier logic 218 illustratively generates a value indicative of the condition of the pathway, at various locations, over which each of the tires 108 has traveled. By way of example, if the acceleration or velocity vectors 196-198, or the load 202 or deflection values 200, or other signals, indicate that the corresponding tire is bouncing or otherwise losing contact with the ground, this may indicate that the condition of the pathway is degrading, and it may need to be graded or that the surface should be otherwise treated. Similarly, the output from traction detection logic 210 may indicate that the tires are losing traction over the pathway at an increasing rate. This may also be used to indicate that the condition of the pathway is degrading. These and other scenarios are contemplated herein as well.

In addition, control criteria extraction system 156 can include other logic 220. Other logic 220 can be used to extract other control criteria from the various sensor signals received by in-rubber sensor systems 124.

Figure 4:
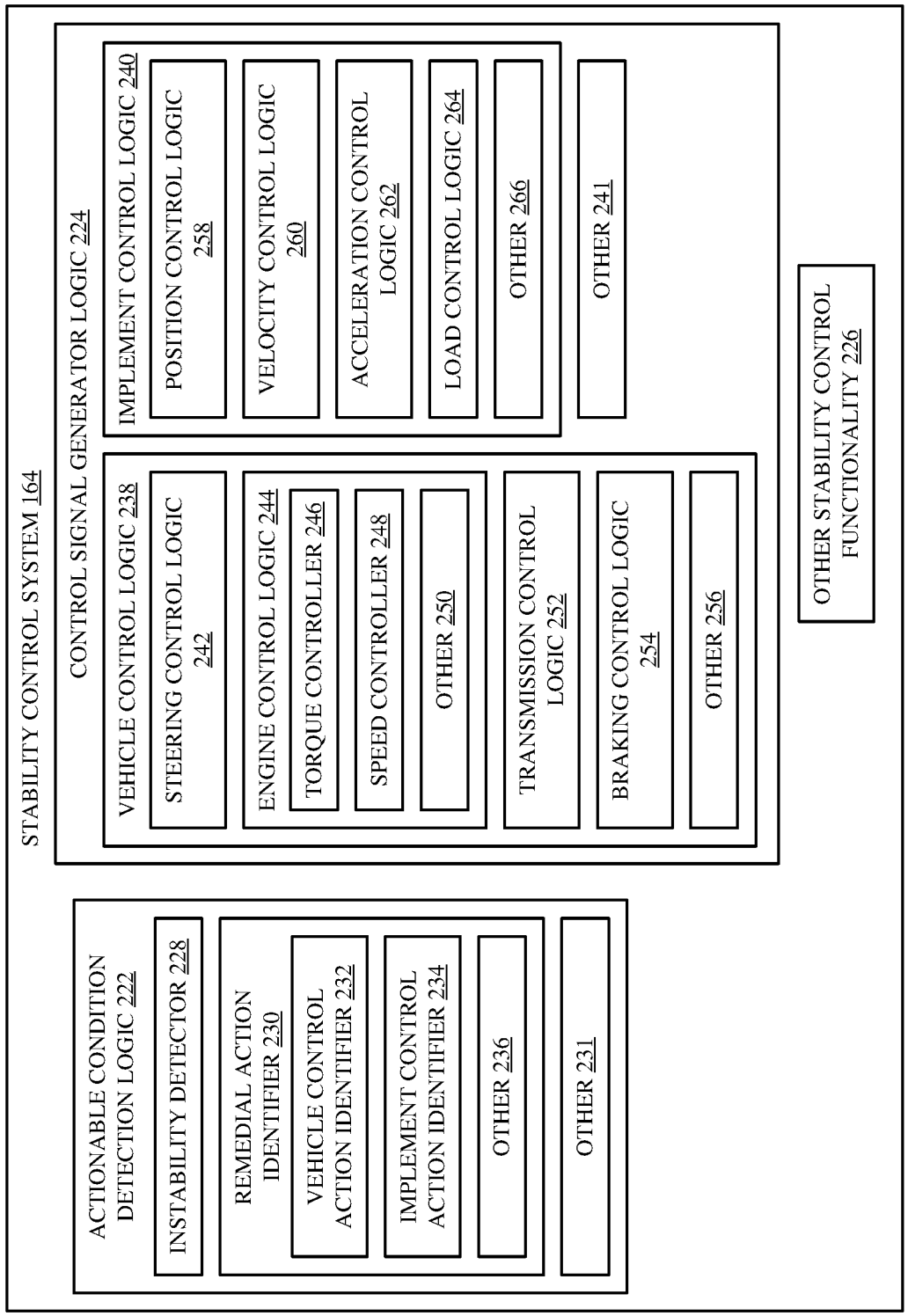
FIG. 4 is a block diagram showing one example of a stability control system in more detail.

FIG. 4 is one example of a more detailed block diagram of stability control system 164. In the example illustrated in FIG. 4, stability control system 164 includes actionable condition detection logic 222, control signal generator logic 224, and it can include a wide variety of other stability control functionality 226. Actionable condition detection logic 222 illustratively includes instability detector 228, remedial action identifier 230 and it can include other items 231. Remedial action identifier 230 illustratively includes vehicle control action identifier 232 and implement control action identifier 234. It can include other items 236 as well.

Instability detector 228 detects an instability condition which may be indicative of an unstable condition in machine 100 or that machine 100 is about to enter an unstable condition. Remedial action identifier 230 identifies a remedial action that can be taken to move machine 100 into a more stable condition, or to inhibit it from entering an unstable condition in the first place. Vehicle control action identifier 232 identifies a vehicle control action that can be taken to remedy the unstable condition. Implement control action identifier 234 identifies an implement control action that can be taken. Identifiers 232 and 234 can identify actions dynamically, using a dynamic model, taking the various sensor signals as inputs to the model. They can also use mappings or lookup tables to identify actions that will most quickly remedy various different instability conditions.

Similarly, instability detector 228 can detect an instability condition by identifying whether the center of gravity of machine 100 is within a threshold distance of a boundary which, if crossed, places machine 150 in an unstable condition. In addition, it can use the output from contact patch change detection logic 208 to determine whether a contact patch for one of the tires is shrinking to indicate that the tire may be about to lift off the ground. This may be an indication that machine 100 is about to tip over or become highly unstable. Detector 228 can use a wide variety of other indicators to identify whether machine 100 is entering an unstable state as well.

Control signal generator logic 224 generates control signals to implement the remedial action identified by remedial action identifier 230. Therefore, logic 224 illustratively includes vehicle control logic 238, implement control logic 240 and it can include other items 241. Vehicle control logic 238 controls vehicle operations to perform the remedial action, while implement control logic 240 controls implement actions to perform the remedial action. It will of course be appreciated that both vehicle and implement actions may be taken in order to inhibit or eliminate an unstable condition as well.

Vehicle control logic 238 includes steering control logic 242, engine control logic 244 (which, itself, includes torque controller 246, speed controller 248, and it can include other items 250), transmission control logic 252, braking control logic 254, and it can include other items 256. Steering control logic 242 may generate control signals that control the steering angle with which machine 100 is steered. In one example, the control signal can define a range of steering angles that can be used to keep machine 100 in a stable condition. It can define limits on the steering angle in one direction or multiple directions, or it can generate control signals limiting the speed with which machine 100 is able to turn. For example, if machine 100 is carrying a load in bucket 110 in a relatively high position, and it is traveling relatively quickly, then steering control logic 242 may define limits on the sharpness with which the operator can turn machine 100, so that it does not become unstable. These are examples only.

Engine control logic 244 can use torque controller 246 to control the torque applied by each of the tires. It can use speed controller 248 to control engine speed. For example, if machine 100 is in an unstable condition, or is about to enter an unstable condition, it may be that the acceleration of the machine should be limited. In that case, torque controller 246 limits the torque that can be applied to the tires. Similarly, it may be that the engine speed should be controlled. Engine speed controller 248 can limit or otherwise control the engine speed.

Transmission control logic 252 illustratively generates control signals to control transmission 176. By way of example, it may limit the ability of the operator or another control system to shift gears in order to maintain machine 100 in a stable condition.

Braking control logic 254 can be used to generate braking control signals to control propulsion subsystem 170. By way of example, if it is detected that machine 100 is in an unstable condition, or is about to enter an unstable condition, then it may be that braking control logic 254 limits the amount of braking that can be applied to avoid an unstable condition.

It should also be noted that the various items of logic in vehicle control logic 238 can be used in conjunction with one another. For instance, it may be that steering control logic 242 limits the sharpness of the steering angle with which machine 100 can be steered and, at the same time, braking control logic 254 limits the amount of braking that can be applied. This avoids a situation in which the operator attempts to steer mobile work machine very sharply, while also braking sharply. This is one example only.

Implement control logic 240 illustratively includes implement position control logic 258, velocity control logic 260, acceleration control logic 262, load control logic 264, and it can include other items 266. Position control logic 258 illustratively generates control signals that control the positioning of a movable element (such as bucket 110 or boom 112). By way of example, if the orientation of machine 100 is such that machine 100 would enter an unstable condition if bucket 110 were raised too high, then position control logic 258 can impose limits on the height to which the operator can control the corresponding actuator to raise the bucket. This is just one example.

It will also be noted that the dynamic movement (e.g., velocity and acceleration) of boom 112 and/or bucket 110 can be controlled as well. For example, velocity control logic 260 illustratively generates control signals to control the velocity with which actuators 180 can be actuated. By way of example, it may be that machine 100 would become unstable if bucket 110 were raised or lowered too quickly. In that case, velocity control logic 260 can generate control signals to limit the velocity with which the actuators 180 can be actuated.

Similarly, acceleration logic 262 can generate control signals to control the acceleration of the movable elements (such as bucket 110 and/or boom 112) to avoid an unstable condition. For instance, if machine 100 would enter an unstable condition if the operator raised the bucket with a relatively high rate of acceleration, then acceleration control logic 262 can generate control signals that limit the rate at which actuators 180 can be controlled to accelerate bucket 110. This is also just one example, Load control logic 264 illustratively generates control signals that control actuators 180 to limit the load that can be carried by the implement (e.g., bucket 110). For instance, if machine 100 is oriented on a side hill, it may be that it would be unstable if bucket 110 were to engage a very heavy load and attempt to lift it. In such as a scenario, load control logic 264 illustratively generates load control signals to limit the force that actuators 180 can exert on the movable elements 182. This, in effect, can limit the load that can be carried by movable elements 182 (e.g., by bucket 110). This is just one example.

Figure 5:
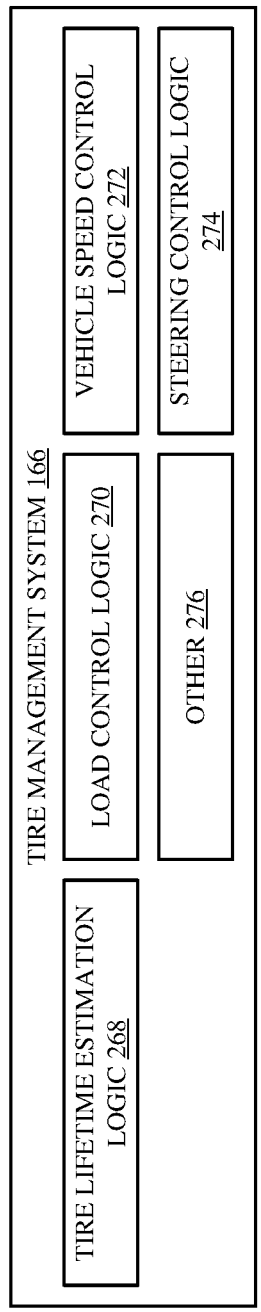
FIG. 5 is a block diagram showing one example of a tire management system in more detail.

FIG. 5 is a block diagram showing one example of tire management system 166 in more detail. In the example shown in FIG. 5, tire management system 166 illustratively includes tire lifetime estimation logic 268, load control logic 270, vehicle speed control logic 272, steering control logic 274, and it can include other items 276. Tire lifetime estimation logic 268 illustratively receives the tire wear identification information from wear identification logic 214 and generates an estimate or tire lifetime for each of the tires 108. Load control logic 270 can generate control signals to limit the amount of load that can be applied to the tires (e.g., the amount of load that can be lifted by bucket 110). Load control logic 270 can be similar to load control logic 264, or they can be different pieces of logic.

Vehicle speed control logic 272 illustratively generates control signals to control the speed of machine 100, given the estimated tire life. For instance, if the tires are highly worn and have a relatively short estimated tire life remaining, then it may be that vehicle speed control logic 272 generates a limit on the top speed with which operator 126 can drive machine 100. The value of the top machine speed limit may vary based upon the terrain over which machine 100 is traveling, based upon the temperature of the rubber, or based upon other items as well.

Steering control logic 274 generates control signals that control steering subsystem 170 based upon the estimated remaining tire life.

Figure 6:
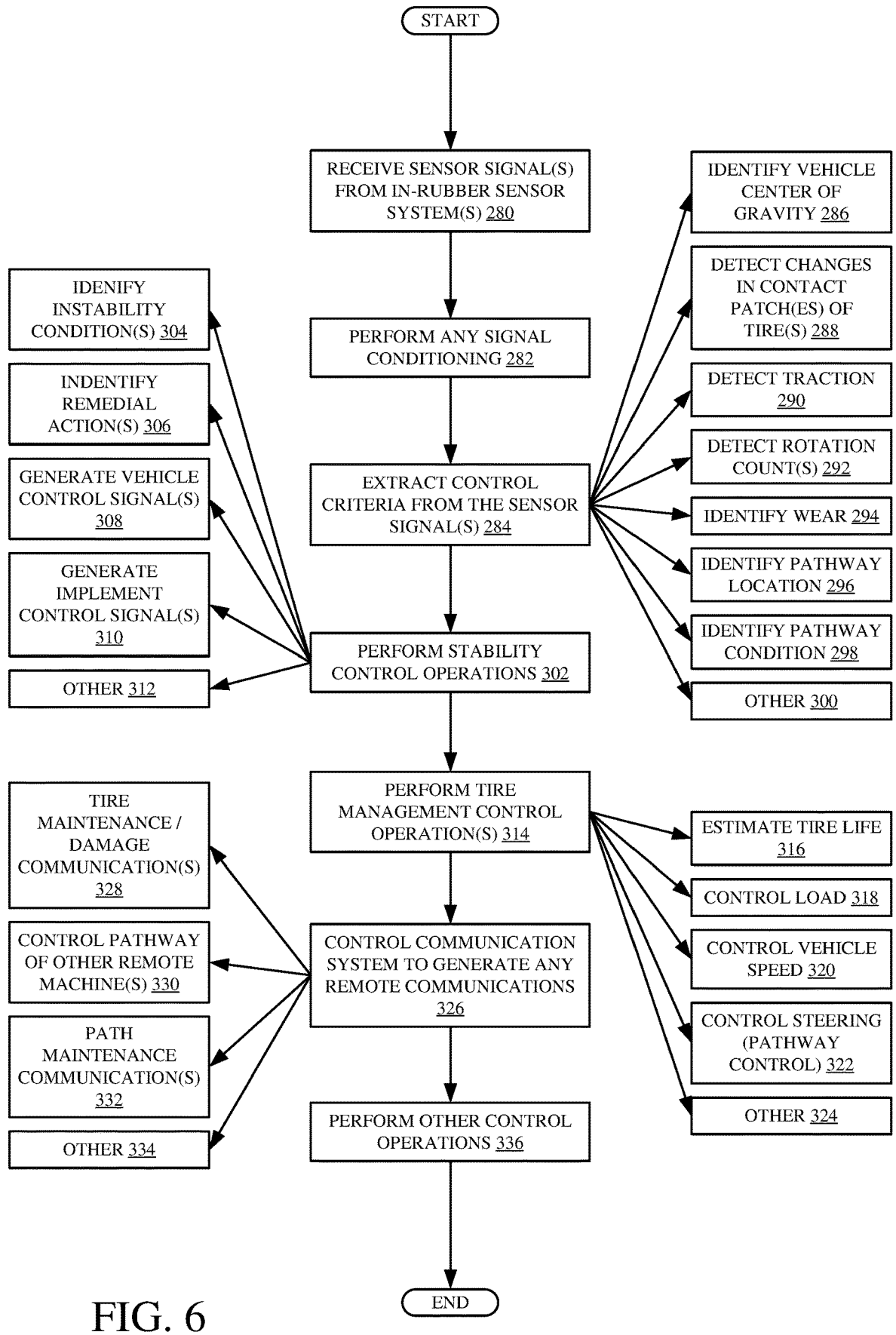
FIG. 6 is a flow diagram illustrating one example of the operation of the mobile machine in generating control signals based upon a tire sensor signal.

FIG. 6 is a flow diagram illustrating one example of the operation of sensor signal processing system 146 and control system 148 in generating control signals based upon the information provided by in-rubber sensor systems 124. It is first assumed that mobile work machine 100 includes the in-rubber sensor systems 124. Sensor signal processing system 146 then receives signals from the in-rubber sensor systems 124. This is indicated by block 280 in the flow diagram of FIG. 6. Conditioning logic 156 then performs any desired signal conditioning that may be performed on the various signals received from systems 124. Performing signal conditioning is indicated by block 282 in the flow diagram of FIG. 6.

Control criteria extraction system 156 then extracts the control criteria from the sensor signals received from in-rubber sensor systems 124. Extracting the control criteria is indicated by block 284 in the flow diagram of FIG. 6. By way of example, center of gravity identifying logic 206 can identify vehicle center of gravity as indicated by block 286. Contact patch change detection logic 208 illustratively detects changes in size of the contact patches for the various tires. This is indicated by block 288. Traction detection logic 210 detects a value indicative of the quality of traction that each tire has with the ground over which it is traveling. This is indicated by block 290. Rotation detector logic 212 illustratively detects and accumulates the rotation counts for each of the tires. This is indicated by block 292. Wear identification logic 214 generates a value indicative of the wear on each of the tires. This is indicated by block 294.

Pathway location identifier logic 296 identifies a pathway over which each tire has traveled. This is indicated by block 296. Pathway condition identifier logic 218 generates a value indicative of a condition of that pathway, at various locations along the pathway. This is indicated by block 298. It may, for instance, only identify areas of the pathway that need attention. Or it may identify the condition of the entire pathway. These and other scenarios are contemplated herein. Other control criteria can be extracted as well, and this is indicated by block 300.

Stability control system 164 then performs stability control operations. This is indicated by block 302. By way of example, instability detector 228 can identify an instability condition that indicates that machine 100 is in an unstable condition, or that it is about to become unstable. Identifying instability conditions is indicated by block 304. Remedial action identifier 230 then identifies a remedial action that can be taken to remedy the instability condition (the unstable condition in which machine 100 is currently in, or the condition that it is about to enter). Identifying remedial actions is indicated by block 306.

In one example, vehicle control action identifier 232 identifies remedial vehicle control actions and implement control action identifier 234 identifies remedial implement control actions. Control signal generator 224 then generates control signals based upon the identified remedial actions. Having vehicle control logic 238 generate vehicle control signals to implement the remedial action is indicated by block 308. In another example, implement control logic 240 can also, or instead, generate implement control signals to implement the remedial action. This is indicated by block 310. Performing stability operations can include other items as well, and this is indicated by block 312. Some other items can, for instance, be to control an operator interface mechanism to alert operator 126 that an unstable condition exists, or is about to exist. This can involve controlling user interface mechanisms 128 in order to display an alert, to sound an alert, or to otherwise identify the instability condition to operator 126. Of course, there can be a wide variety of other stability control operations as well.

Tire management system 166 then performs tire management control operations. This is indicated by block 314. By way of example, tire lifetime estimation logic 268 can estimate the remaining tire lifetime for each of the tires. This is indicated by block 316. Load control logic 270 can control the load that is engaged by machine 100. Controlling the load is indicated by block 318. Vehicle speed control logic 272 can control vehicle speed. This is indicated by block 320. Steering control logic 274 can perform steering control. This is indicated by block 322. By way of example, the steering control logic may control the steering subsystem so that machine 100 avoids pathways that are in rough condition, if the tire life is below a threshold value. It may inhibit operation of machine 100 on various surfaces, or in other places based upon the estimated tire lifetime. Other tire management control operations can be performed as well, and this is indicated by block 324.

Control system 148 can also control communication system 152 to generate any remote communications. This is indicated by block 326. For instance, control system 148 can control communication system 152 to generate tire maintenance or damage communications that indicate to a remote vendor system 132 indicating that machine 100 needs its tires serviced, maintained or repaired. Generating tire maintenance/damage communications is indicated by block 328.

System 148 can also control communication system 152 to communicate a desired pathway to other mobile work machines 130. For instance, where it is desired to increase compaction of a pathway, then control system 148 may communicate the particular pathway taken by the tires of mobile work machine 100 to the other mobile work machines 130 so they can follow the same pathway, and thus increase compaction of the surface. Similarly, where compaction is to be avoided (such as with agricultural machines) then the pathway taken by machine 100 can be communicated to other mobile work machines 130 so that they can avoid using that exact same pathway. Controlling the pathway of other remote machines is indicated by block 330.

Control system 148 can also control communication system 152 to send pathway maintenance communications to other remote systems 132 or other work machines 130 that are tasked with maintaining a pathway. By way of example, if pathway condition identifier logic 218 provides information indicative of various locations of the pathway that have a condition that is degrading, and needs maintenance, then control system 148 can provide this information to communication system 152 and control communication system 152 to send the pathway maintenance communications to the other remote systems 132 or other mobile work machines 130. Sending pathway maintenance communications is indicated by block 332. The communication system 152 can be controlled to send other communications as well, and this is indicated by block 334.

Control system 148 can also perform any other desired control operations based upon the information from in-rubber sensor systems 124. This is indicated by block 336. By way of example, it can use load management system 162 to control the load carried by machine 100, based upon the wear on the particular tires, based upon the center of gravity of the machine at a given time, based upon the remaining tire lifetime, based upon the tire pressure, tire temperature, or the number of revolutions that the tires have undergone. It can control the load based upon the condition of the pathway over which machine 100 is traveling or other characteristics of the surface over which machine 100 is traveling. Control system 148 can also control the propulsion subsystem 170 and other actuators 180 to perform traction control. It can control the amount of torque and acceleration applied to each of the tires through the transmission 176 and by controlling engine 174. It can perform traction control to eliminate slippage in a wide variety of different ways. Control system 148 can also perform a wide variety of other control operations based on the information received from in-tire sensor systems 124. All of these configurations are contemplated herein.

Figure 7:
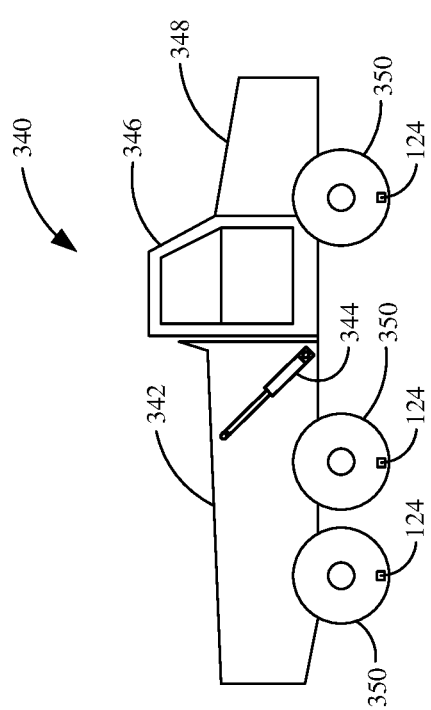
FIGS. 7 and 8 are additional examples of other mobile machines.
Figure 8:
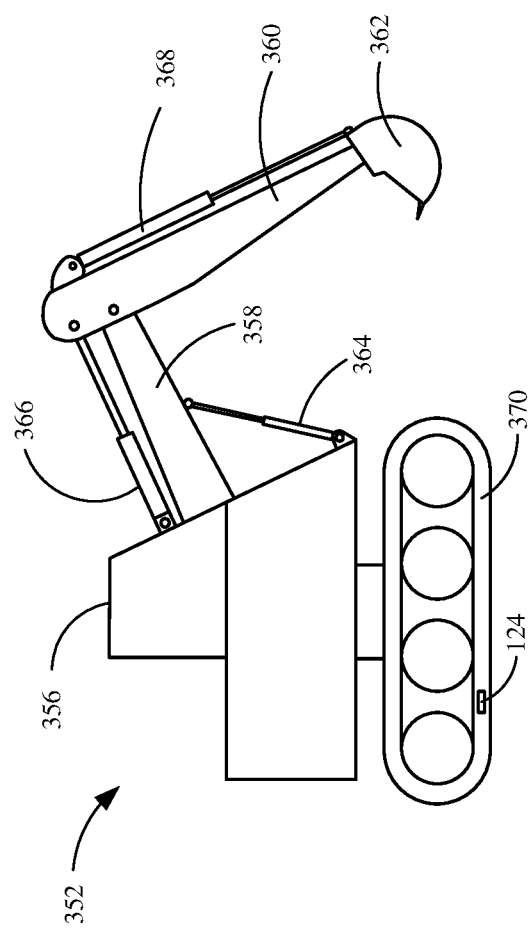

FIGS. 7 and 8 are similar to FIG. 1, except that they show two different work machines. FIG. 7 shows that the mobile work machine can be a dump truck 340. Dump truck 340 illustratively has a dump box 342, that is controlled by actuators 344. It has an operator compartment 346 and an engine compartment 348. It also has a number of tires 350. Each of the tires 350 illustratively include an in-rubber sensor system 124. Thus, the same types of information described above with respect to machine 100 can be generated for machine 340 as well.

FIG. 8 is similar to FIGS. 1 and 7 above, except that the mobile work machine comprises an excavator 352 or any other machine in which the ground-engaging elements are rubber tracks 370. In the example shown in FIG. 8, excavator 352 has an operator's compartment 356, movable elements 358 and 360 as well as bucket 362. The movement of elements 358 and 360 and bucket 362 are controlled by actuators 364, 366 and 368, respectively. Excavator 352 also has an engine with a transmission that drives rotation of tracks 370. Each of the tracks 370 illustratively has an in-rubber sensor system 124 that provides the same type of information discussed above. Thus, the type of information that can be used from sensor 124 includes the track pressure, the rubber temperature of track 370, the acceleration and velocity vectors detected in track 370, any type of track deflection, the load on track 370, the size of the contact patch (or the length of the contact patch) among a wide variety of other information. This can be used by control criteria extraction system 156 to extract a wide variety of different control criteria, such as those described above with respect to FIG. 3, or other criteria, that can be used to control excavator 352.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
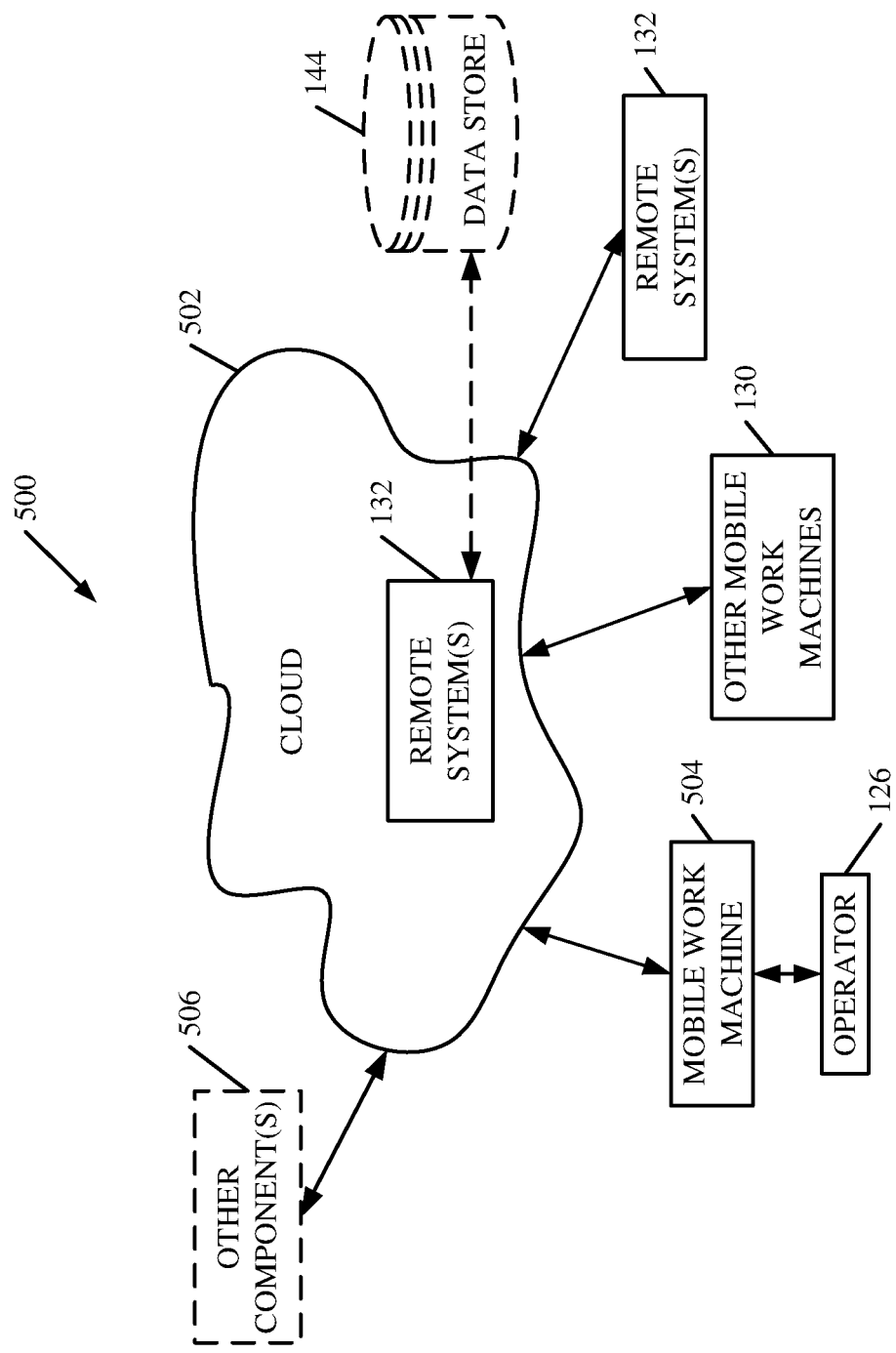
FIG. 9 is a block diagram showing one example of the mobile machine illustrated in FIG. 2, deployed in a cloud computing architecture.

FIG. 9 is a block diagram of machine 100, shown in FIG. 2, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 9, some items are similar to those shown in FIG. 2 and they are similarly numbered. FIG. 9 specifically shows that remote system(s) 132 can be located at a remote server location 502. Therefore, machine 100 accesses those systems through remote server location 502.

FIG. 9 also depicts another example of a remote server architecture. FIG. 9 shows that it is also contemplated that some elements of FIG. 2 are disposed at remote server location 502 while others are not. By way of example, data store 140 or other components 506 can be disposed at a location separate from location 502, and accessed through the remote server at location 502. Regardless of where they are located, they can be accessed directly by machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine 100 comes close to the fuel truck for fueling, the system automatically collects the information from the machine 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 100 until the machine 100 enters a covered location. The machine 100, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
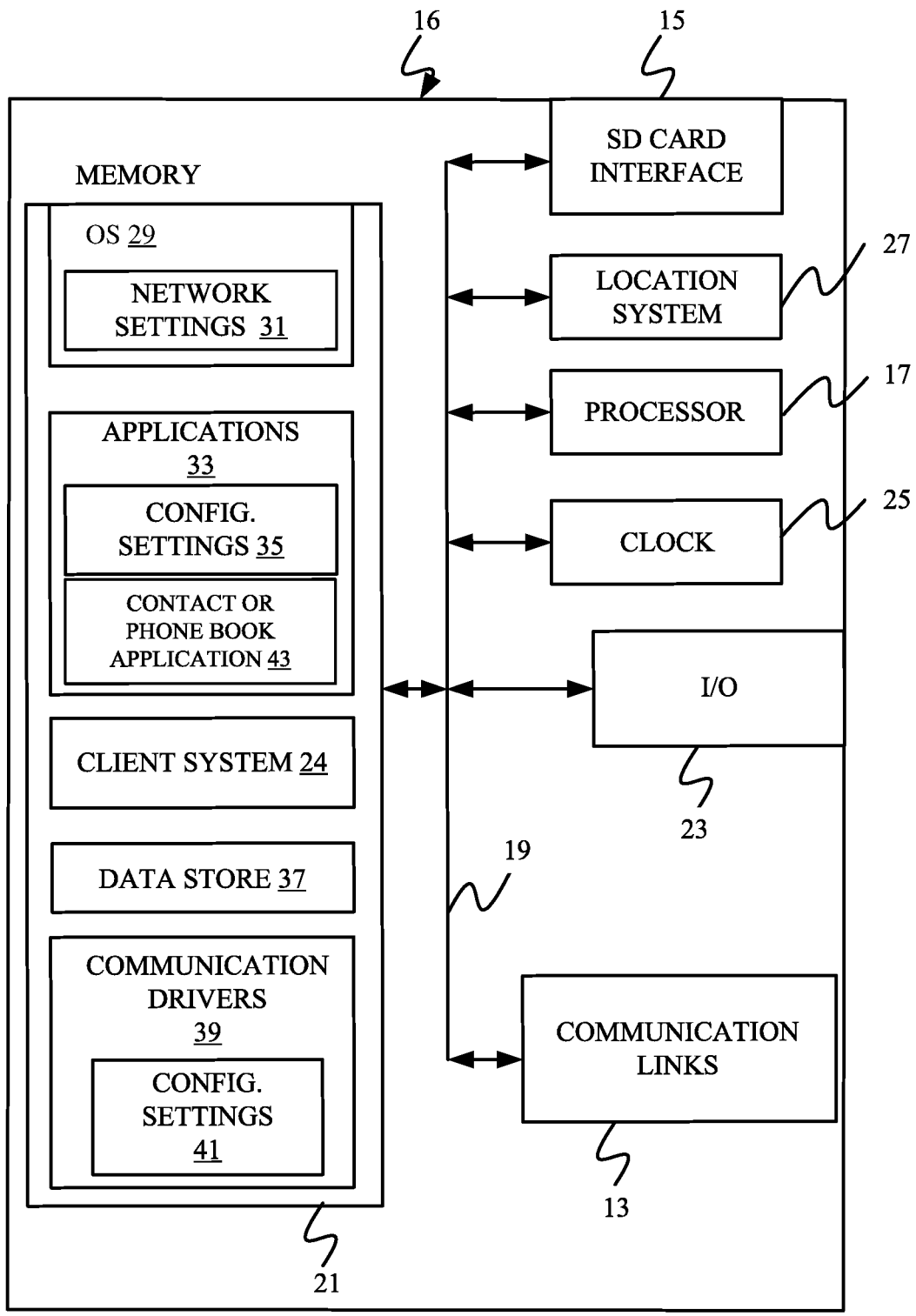
FIGS. 10-12 show block diagrams of mobile devices that can be used in the architectures shown in the previous figures.
Figure 11:
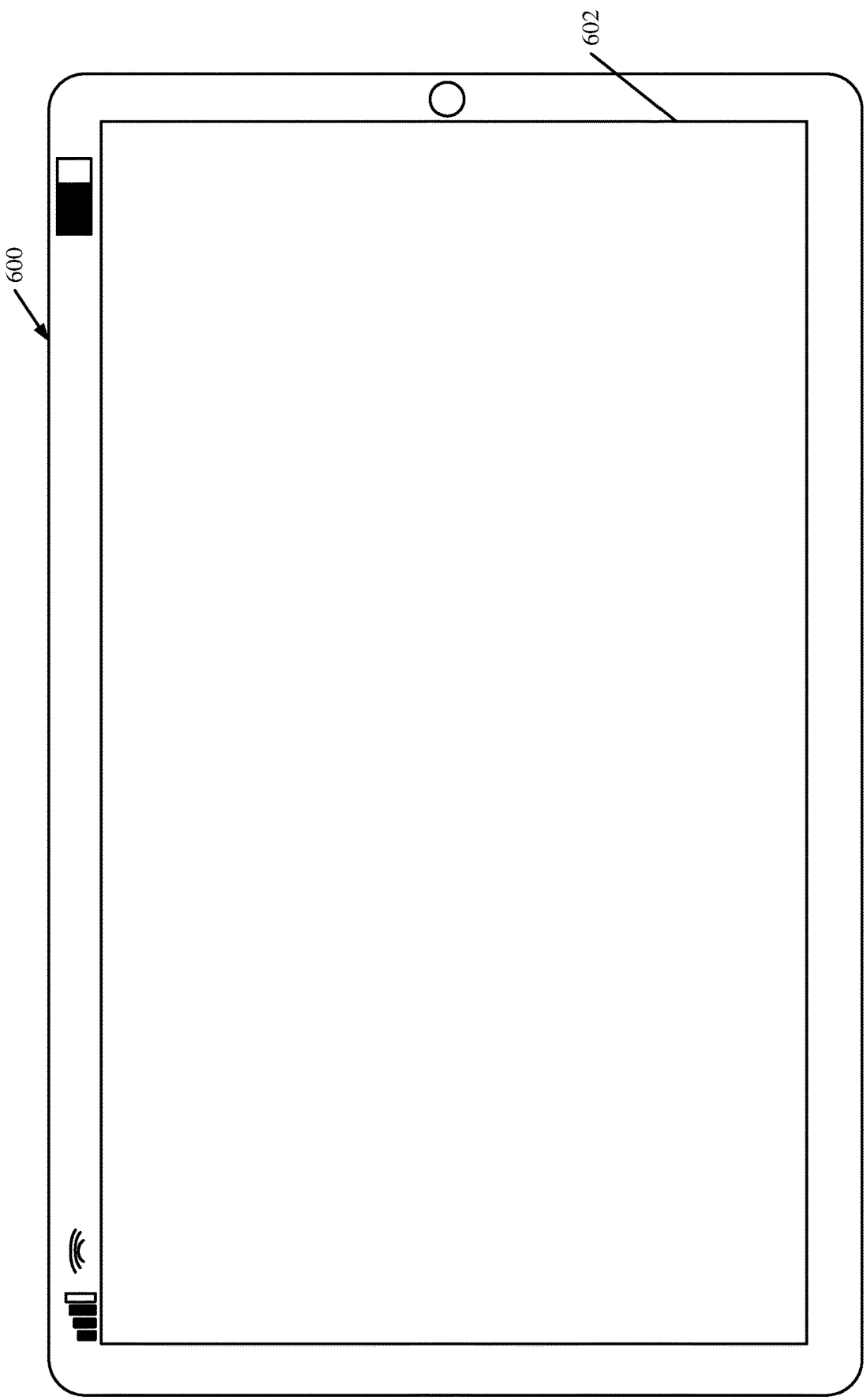
Figure 12:
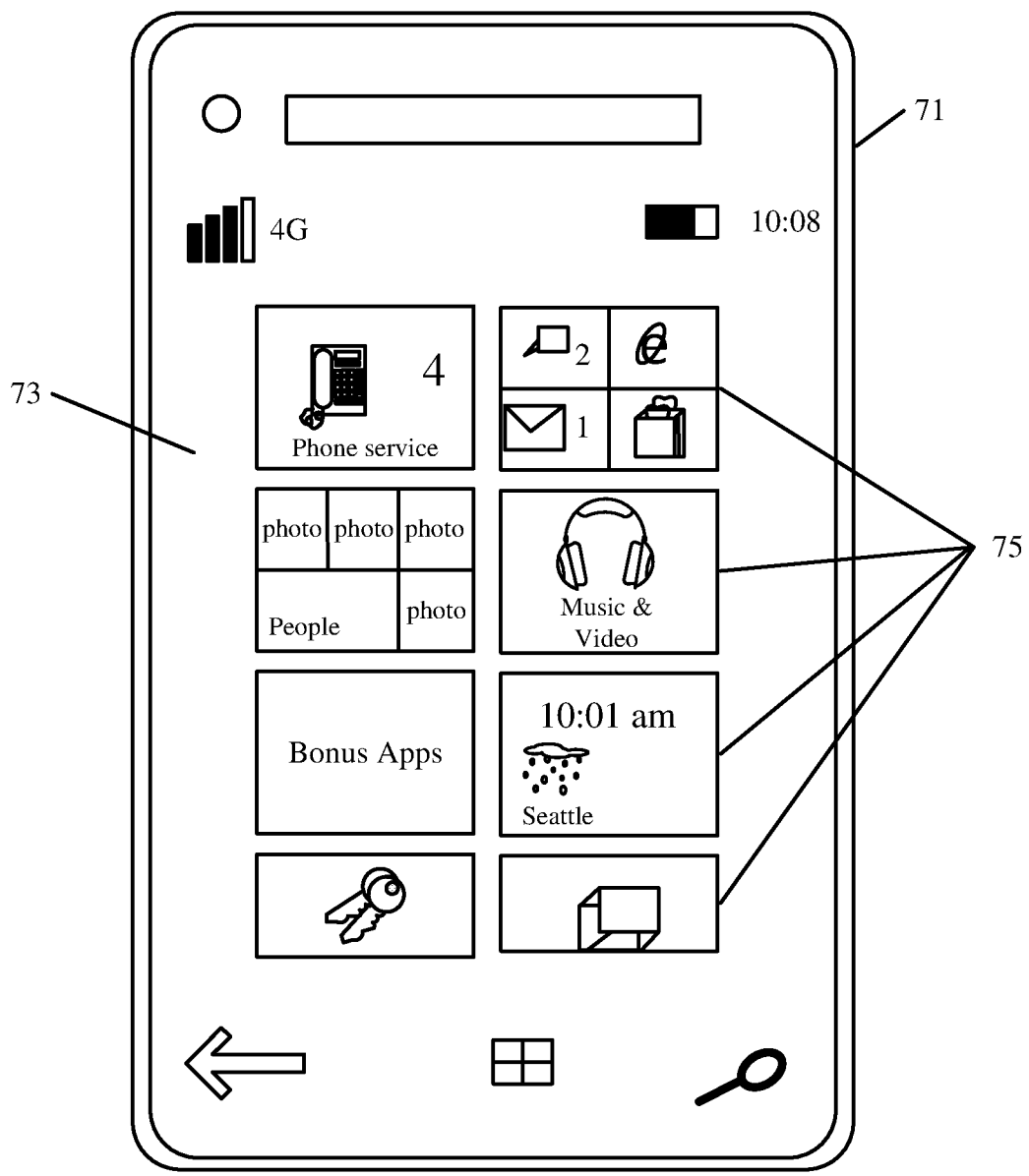

FIG. 10 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 100 for use in generating, processing, or displaying the control signals. FIGS. 11-12 are examples of handheld or mobile devices.

FIG. 10 provides a general block diagram of the components of a client device 16 that can run some components shown in FIG. 1, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 11 shows one example in which device 16 is a tablet computer 600. In FIG. 11, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
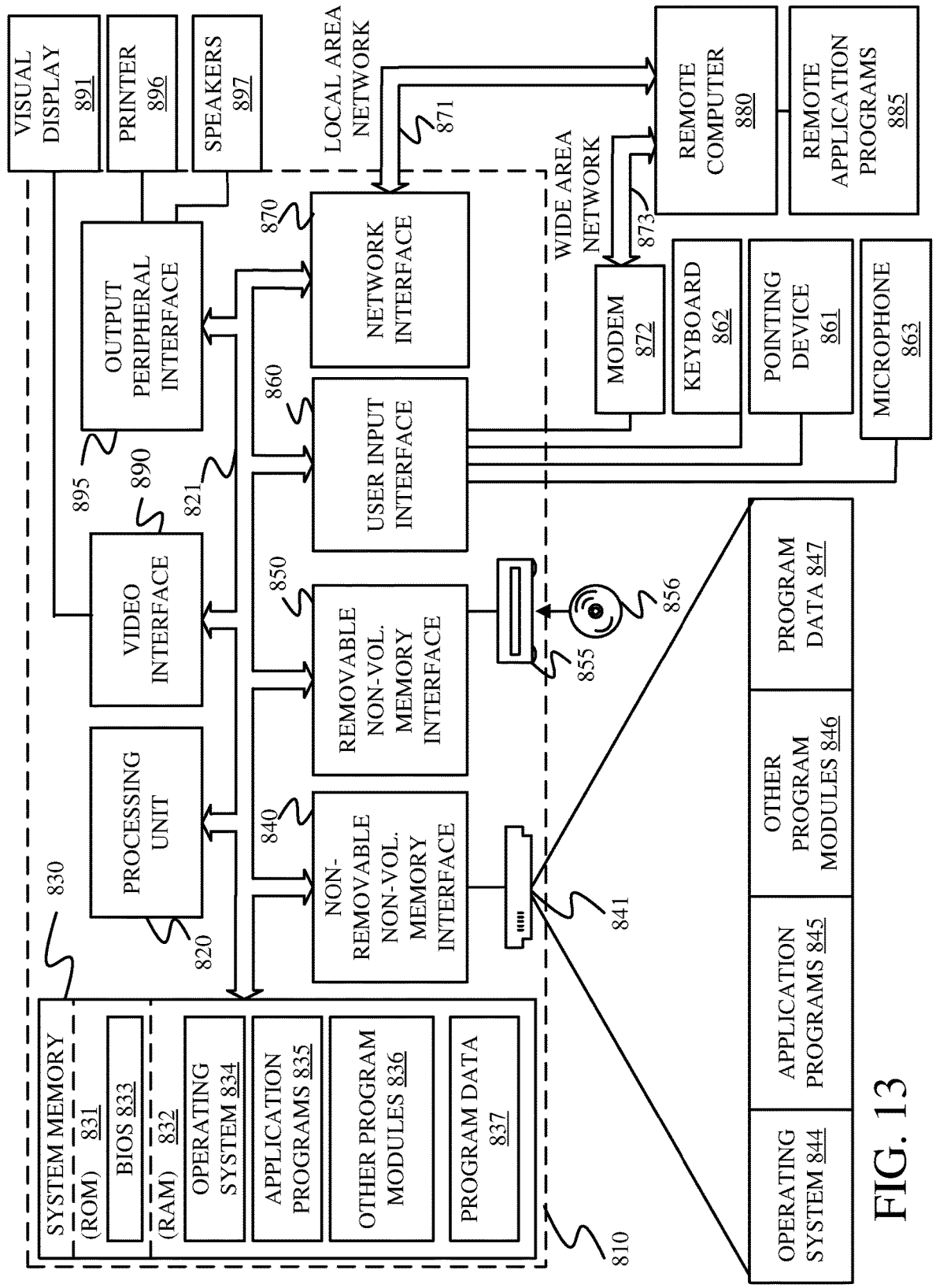
FIG. 13 is a block diagram of one example of a computing environment that can be used in the architectures shown in the previous figures.

FIG. 13 is one example of a computing environment in which elements of FIG. 2, or parts of it, (for example) can be deployed. With reference to FIG. 13, an example system for implementing some embodiments includes a general-purpose computing device in the form of a computer 810. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile work machine, comprising:
a set of controllable subsystems;
a set of ground engaging elements;
a propulsion system that drives movement of the ground engaging elements to propel the mobile work machine;
an in-rubber sensing system, in each of the ground engaging elements, that senses a set of variables indicative of characteristics of a corresponding ground engaging element and generates a set of sensor signals indicative of the sensed variables;

a control criteria extraction system that identifies control criteria based on the sensor signals; and a stability control system that generates a control signal to control at least one of the controllable subsystems based on the control criteria.

Example 2 is the mobile work machine of any or all previous examples wherein the stability control system comprises:

actionable condition detection logic configured to identify an actionable condition that is addressable by controlling the at least one controllable subsystem, based on the control criteria.

Example 3 is the mobile work machine of any or all previous examples wherein the stability control system comprises:

control signal generator logic configured to generate the control signal based on the identified actionable condition.

Example 4 is the mobile work machine of any or all previous examples wherein the actionable condition detection logic comprises:

an instability detector configured to identify, as the actionable condition, an instability condition indicative of instability of the mobile work machine, based on the control criteria.

Example 5 is the mobile work machine of any or all previous examples wherein the actionable condition detection logic comprises:

a remedial action identifier configured to identify a remedial action based on the identified instability condition.

Example 6 is the mobile work machine of any or all previous examples wherein the control signal generator logic is configured to generate the control signal to control the at least one controllable subsystem to perform the remedial action.

Example 7 is the mobile work machine of any or all previous examples wherein the mobile work machine comprises a vehicle, at least one of the controllable subsystems comprising a vehicle controllable subsystem that controls a portion of the vehicle, and wherein the control signal generator logic comprises:

vehicle control logic configured to generate the control signal to control the vehicle controllable subsystem of the mobile work machine to perform the remedial action.

Example 8 is the mobile work machine of any or all previous examples and further comprising a movable implement attached to the mobile work machine and a controllable actuator that is controllable to move the movable implement, wherein the control signal generator logic comprises:

implement control logic configured to generate the control signal to control the implement to perform the remedial action.

Example 9 is the mobile work machine of any or all previous examples wherein the instability detector is configured to identify a center of gravity of the mobile work machine based on the control criteria and to identify the instability condition based on the identified center of gravity.

Example 10 is the mobile work machine of any or all previous examples wherein the in-rubber sensing system is configured to generate, as one of the sensor signals, a contact patch value indicative of a size of a contact area between a corresponding ground engaging element and ground that it is engaging and wherein the control criteria extraction system is configured to identify a change in the contact patch value and wherein the instability detector is configured to identify the instability condition based on the change in the contact patch value.

Example 11 is the mobile work machine of any or all previous examples and further comprising:

element lifetime estimation logic configured to generate an estimate of lifetime of the corresponding ground engaging element based on the control criteria; and speed control logic configured to generate a speed control signal to control the propulsion system to limit a ground speed of the mobile work machine based on the estimated lifetime of the corresponding ground engaging element.

Example 12 is the mobile work machine of any or all previous examples and further comprising:

a communication system; and a control system configured to control the communication system to send an indication of the control criteria to another mobile work machine or to a remote computing system.

Example 13 is a computer implemented method of controlling a mobile work machine, the method comprising:

sensing, with an in-rubber sensing system, a set of variables indicative of characteristics of a corresponding ground engaging element that is driven by an engine in the mobile work machine to propel the mobile work machine;

generating a set of sensor signals indicative of the sensed variables;

identifying control criteria based on the sensor signals; and generating a control signal to control at least one of a plurality of controllable subsystems in the mobile work machine based on the control criteria.

Example 14 is the method of any or all previous examples wherein generating a control signal comprises:

detecting an instability condition indicative of instability of the mobile work machine, based on the control criteria;

identifying a remedial action based on the detected instability condition; and generating the control signal to control the at least one controllable subsystem to perform the remedial action.

Example 15 is the method of any or all previous examples wherein the controllable subsystem comprises a steering subsystem that is actuated to steer the mobile work machine through a range of steering angles and wherein generating a control signal comprises:

generating a steering angle control signal to control the steering subsystem to limit the range of steering angles based on the instability condition.

Example 16 is the method of any or all previous examples wherein the controllable subsystem comprises an actuator configured to drive movement of a movable element attached to the mobile work machine and wherein generating a control signal comprises:

generating a movable element control signal to control the actuator to control movement of the movable element based on the instability condition.

Example 17 is the method of any or all previous examples wherein the controllable subsystem comprises a propulsion subsystem that is controlled to propel the mobile work machine and wherein generating a control signal comprises:

generating a propulsion control signal to control the propulsion subsystem to propel the mobile work machine based on the instability condition.

Example 18 is the method of any or all previous examples wherein the controllable subsystem comprises an actuator configured to drive movement of a movable element attached to the mobile work machine and wherein generating a control signal comprises:

generating a position control signal to control the actuator to control a position of the movable element based on the instability condition.

Example 19 is the method of any or all previous examples wherein the controllable subsystem comprises an actuator configured to drive movement of a movable element attached to the mobile work machine and wherein generating a control signal comprises:

generating a dynamic movement control signal to control the actuator to control dynamic movement of the movable element based on the instability condition.

Example 20 is a mobile work machine, comprising:
a set of controllable subsystems;
a set of ground engaging, rubber tracks;
a propulsion system that drives movement of the rubber tracks to propel the mobile work machine;
an in-rubber sensing system, in each of the rubber tracks, that senses a set of variables indicative of characteristics of a corresponding rubber track and generates a set of sensor signals indicative of the sensed variables;
a control criteria extraction system that extracts control criteria from the sensor signals; and
a control system that generates a control signal to control at least one of the controllable subsystems based on the control criteria.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile work machine, comprising:
a set of controllable subsystems;
a set of ground engaging elements;
a propulsion system configured to drive movement of the ground engaging elements to propel the mobile work machine over a surface;
an in-rubber sensing system, in each of the ground engaging elements, configured to sense a set of variables indicative of characteristics of a contact patch for each corresponding ground engaging element and generate sensor signals, indicative of a contact patch value for each corresponding ground engaging element, each contact patch value comprising a value of the characteristics of the contact patch for each corresponding ground engaging element;
a control criteria extraction system configured to identify a decrease in the contact patch value for one or more of the corresponding ground engaging element based on the set of sensor signals; and
a control system configured to generate a control signal to control at least one of the controllable subsystems based on the identified decrease in the contact patch value for the one or more of the ground engaging element.

2. The mobile work machine of claim 1 wherein the identified decrease in the contact patch value indicates that a size of the contact patch for the one or more of the ground engaging elements is decreasing, the mobile work machine further comprising:
an instability detector configured to identify an instability condition indicative of instability of the mobile work machine, based on the decreasing size of the contact patch for the at least one ground engaging element, and wherein the control system generates the control signal to control one or more of the controllable subsystems based on the instability condition.

3. The mobile work machine of claim 1 wherein the in-rubber sensing system, in each of the ground engaging elements, are further configured to sense a set of variables indicative of a temperature of each of the ground engaging elements and a number of revolutions of the ground engaging elements and generate additional sensor signals indicative of a temperature value and a revolutions value for each corresponding ground engaging element.

4. The mobile work machine of claim 3 wherein the in-rubber sensing system, in each of the ground engaging elements, are further configured to sense a set of variables indicative of an internal pressure of each of the ground engaging elements and generate additional sensor signals indicative of an internal pressure value for each corresponding ground engaging element, the mobile work machine further comprising:
a load management system configured to, based on the corresponding contact patch value and the corresponding internal pressure value, identify a load value for each corresponding ground engaging element indicative of a load on each corresponding ground engaging element; and
wherein the control system generates an additional control signal to control at least one of the controllable subsystems based on the identified load.

5. The mobile work machine of claim 4 and further comprising:
wear identification logic configured to identify a wear of each corresponding ground engaging element, based on the revolutions value, the temperature value, the internal pressure value, and the load value for each corresponding ground engaging element; and
wherein the control system generates an additional control signal to control at least one of the controllable subsystems based on the identified wear.

6. The mobile work machine of claim 1 wherein the control criteria extraction system further comprises:
center of gravity identifying logic configured to, based on the contact patch value for each corresponding ground engaging element, identify a location of a center of gravity of the mobile work machine relative to a polygon bounded by a line joining the contact patches ground engaging elements.

7. The mobile work machine of claim 6 further comprising:
an instability detector configured to identify an instability condition indicative of instability of the mobile work machine, based on the location of the center of gravity of the mobile work machine relative to the polygon bounded by the line joining the contact patches of the ground engaging elements, and wherein the control system generates the control signal to control at least one of the controllable subsystems based on the instability condition to change the location of the center of gravity relative to the polygon bounded by the line joining the contact patches of the ground engaging elements.

8. The mobile work machine of claim 1, the mobile work machine further comprising:
pathway condition identifier logic configured to generate a pathway condition value, corresponding to each ground engaging element, indicative of a condition of the pathway traveled by each ground engaging element.

9. The mobile work machine of claim 8 wherein the in-rubber sensing system, in each of the ground engaging elements, are further configured to sense a set of variables indicative of characteristics of traction for each corresponding ground engaging element and generate additional sensor signals indicative of a traction value for each corresponding ground engaging element, the mobile work machine further comprising:

traction detection logic configured to identify a change in a traction of at least one ground engaging element based on the traction value for the at least one ground engaging element; and wherein the pathway condition identifier logic identifies the condition of the pathway is degrading, based on the identified change in traction of the at least one ground engaging element.

10. The mobile work machine of claim 1 further comprising:

a location sensor configured to generate sensor signals indicative of locations of the mobile work machine as the mobile machine travels over the surface; and pathway location identifier logic configured to identify a location of a pathway over which each ground engaging element has traveled, based on the contact patch value corresponding to each ground engaging element and the location of the mobile machine.

11. The mobile work machine of claim 10 wherein the control signal controls a route of the mobile work machine to align a prospective path of the ground engaging elements of the mobile work machine relative to the identified location of the pathway, to control a compaction of the pathway.

12. The mobile work machine of claim 10 further comprising:

a communication system;

wherein the control system is configured to control the communication system to send the control signal to another mobile work machine to control a route of the other mobile work machine to align a prospective path of ground engaging elements of the other mobile work machine relative to the identified location of the pathway, to control a compaction of the pathway.

13. A computer implemented method of controlling an off-road mobile work machine, the method comprising:

sensing, with an in-rubber sensing system, a set of variables indicative of characteristics of a contact patch of a corresponding ground engaging element for one or more of a plurality of ground engaging elements that are driven by an engine in the off-road mobile work machine to propel the off-road mobile work machine in a direction of travel over an off-road surface;

generating a set of sensor signals, for each of the plurality of ground engaging elements, indicative of a contact patch value comprising the characteristics of the contact patch of the corresponding ground engaging element while the off-road mobile work machine is traveling over the off-road surface;

identifying a decrease in the contact patch value, based on the set of sensor signals, for one or more of the ground engaging elements while the off-road mobile work machine is traveling over the off-road surface; and generating a control signal to control at least one of a plurality of controllable subsystems in the off-road mobile work machine, based on the decrease in the contact patch value, while the off-road mobile work machine is traveling over the off-road surface.

14. The method of claim 13 wherein identifying a decrease in the contact patch value comprises identifying a decrease in a size of the contact patch for that one or more of the ground engaging elements and wherein generating a control signal based on the change in the contact patch value comprises:

detecting an instability condition indicative of instability of the off-road mobile work machine, based on the decrease in size of the contact patch for the one or more ground engaging elements;

identifying a remedial action based on the decrease in size of the contact patch for the one or more ground engaging elements; and generating the control signal to control the at least one controllable subsystem to perform the remedial action.

15. The method of claim 14 wherein the controllable subsystem comprises a steering subsystem that is actuated to steer the off-road mobile work machine through a range of steering angles and wherein generating the control signal to control the at least one controllable subsystem to perform the remedial action comprises:

generating a steering angle control signal to control the steering subsystem to limit a range of steering angles based on the decrease in size of the contact patch for the one or more ground engaging elements.

16. The method of claim 14 wherein the controllable subsystem comprises an actuator configured to drive movement of a movable element attached to the off-road mobile work machine and wherein generating the control signal to control the at least one controllable subsystem to perform the remedial action comprises:

generating a movable element control signal to control the actuator to control a position of the movable element based on the decrease in size of the contact patch for the at least one ground engaging element.

17. The method of claim 14 wherein the controllable subsystem comprises a propulsion subsystem that is controlled to propel the off-road mobile work machine and wherein generating the control signal to control the at least one controllable subsystem to perform the remedial action comprises:

generating a propulsion control signal to control the propulsion subsystem to change a travel speed of the off-road mobile work machine based on the decrease in size of the contact patch for the one or more ground engaging elements.

18. The method of claim 14 wherein the controllable subsystem comprises an actuator configured to drive movement of a movable element attached to the off-road mobile work machine and wherein generating the control signal comprises:

generating a load control signal to control the actuator to limit a load that can be carried by the movable element based on the decrease in size of the contact patch for the one or more ground engaging elements.

19. The method of claim 13 and further comprising:

identifying a size of the contact patch of each corresponding ground engaging element, based on the contact patch value for each corresponding ground engaging element;

identifying a location of a center of gravity of the off-road mobile work machine relative to a polygon bounded by a line joining the contact patches of the ground engaging elements; and generating an additional control signal to control at least one of the plurality of controllable subsystems based on the identified location of the center of gravity of the off-road mobile work machine relative to the polygon bounded by the line joining the contact patches of the ground engaging elements, wherein generating the control signal comprises one or more of:

generating a steering angle control signal to control a steering subsystem to limit a range of steering angles of the off-road mobile work machine, based on the identified location of the center of gravity relative to the polygon bounded by the line joining the contact patches of the ground engaging elements;

generating a movable element control signal to control an actuator to control a position of a moveable element attached to the off-road mobile work machine, relative to the surface, based on the identified location of the center of gravity relative to the polygon bounded by the line joining the contact patches of the ground engaging elements; and generating a propulsion control signal to control the propulsion subsystem to change a travel speed of the off-road mobile work machine based on identified location of the center of gravity relative to the polygon bounded by the line joining the contact patches of the ground engaging elements.

20. A mobile work machine, comprising:

a set of controllable subsystems;

a set of ground engaging elements;

a propulsion system that drives movement of the ground engaging elements to propel the mobile work machine over a surface;

an in-rubber sensing system, in each of the ground engaging elements, that senses a set of variables indicative of characteristics of a contact patch for each of the ground engaging elements and generates a contact patch value, as a set of sensor signals, indicative of the characteristics of the contact patch for each of the ground engaging elements;

a control criteria extraction system configured to determine a decrease in a size of the contact patch for one or more of the ground engaging elements;

an instability detector configured to identify a tipping condition indicative of the at least one ground engaging element being about to lift off the surface, based on the determined decrease in size of the contact patch for the one or more ground engaging element; and a control system configured to generate a control signal to control at least one of the controllable subsystems based on the tipping condition.

* * * * *